US012596851B2

(12) United States Patent
Miyazawa et al.

(10) Patent No.:     US 12,596,851 B2
(45) Date of Patent:        Apr. 7, 2026

(54) INFORMATION PROCESSING DEVICE

(71) Applicant: NIDEC INSTRUMENTS CORPORATION, Nagano (JP)

(72) Inventors: Shinya Miyazawa, Nagano (JP); Junro Takeuchi, Nagano (JP); Masaya Fujimoto, Nagano (JP); Yosuke Oguchi, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 30 days.

(21) Appl. No.: 18/842,027

(22) PCT Filed: Feb. 24, 2023

(86) PCT No.: PCT/JP2023/004976
§ 371 (c)(1),
(2) Date: Aug. 27, 2024

(87) PCT Pub. No.: WO2023/162779
PCT Pub. Date: Aug. 31, 2023

(65) Prior Publication Data
US 2025/0173468 A1      May 29, 2025

(30) Foreign Application Priority Data
Feb. 28, 2022     (JP) ................................. 2022-029297

(51) Int. Cl.
*G06F 21/86*          (2013.01)
*H05K 1/02*          (2006.01)
(52) U.S. Cl.
CPC ........... *G06F 21/86* (2013.01); *H05K 1/0265* (2013.01)
(58) Field of Classification Search
CPC .......... G06F 21/86; H05K 1/0265; G09F 9/00
See application file for complete search history.

(56) References Cited

U.S. PATENT DOCUMENTS

| | | | | |
|---|---|---|---|---|
| 10,216,968 B2 * | 2/2019 | Kuwaki | ................. | G06F 21/86 |
| 2009/0094700 A1 * | 4/2009 | Goto | ....................... | G06F 21/86 |
| | | | | 726/26 |

(Continued)

FOREIGN PATENT DOCUMENTS

| | | | | |
|---|---|---|---|---|
| EP | 2610823 B1 * | 3/2016 | ............... | G09C 1/00 |
| JP | 2015191535 A | 11/2015 | | |
| JP | 2020077082 A | 5/2020 | | |

OTHER PUBLICATIONS

International Search Report in PCT/JP2023/004976, mailed Apr. 4, 2023. 4pp.

*Primary Examiner* — John M Macilwinen
(74) *Attorney, Agent, or Firm* — HAUPTMAN HAM, LLP

(57)        ABSTRACT

An information processing device includes a control board, a housing in which the control board is accommodated, a display which is fixed to the housing on an outer side of the housing, a flexible printed board which is disposed inside the housing and covers a face on a first direction side of the control board, and a detection mechanism for detecting that the display has been detached from the housing. The flexible printed board formed with a tamper detection pattern is formed in a box shape whose second direction side is opened and is disposed on the second direction side with respect to the display. The detection mechanism includes a contact type detection switch and a rod-shaped member which presses the detection switch, and the rod-shaped member is pressed against the detection switch by the display which is fixed to the housing.

18 Claims, 5 Drawing Sheets

(56)        References Cited

U.S. PATENT DOCUMENTS

| | | | |
|---|---|---|---|
| 2010/0242115 A1* | 9/2010 | Shi ........................ | H05K 5/0208 |
| | | | 361/749 |
| 2017/0061746 A1* | 3/2017 | Tanaka ................. | G06K 7/0004 |
| 2021/0259101 A1* | 8/2021 | Sasaki .................... | H05K 1/181 |

* cited by examiner

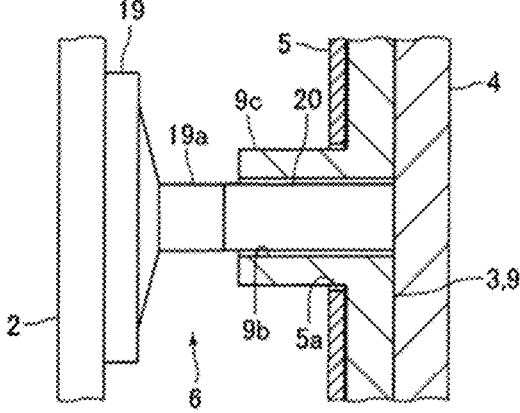
FIG. 7A
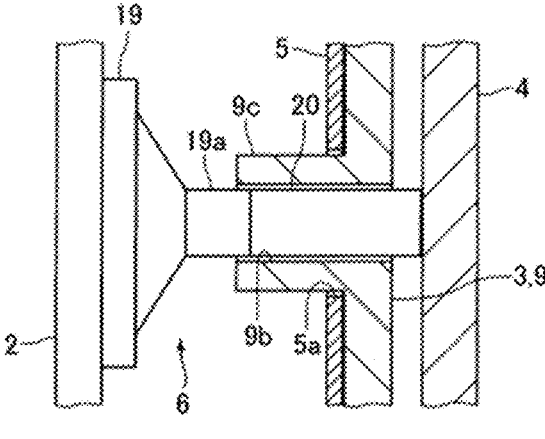
FIG. 7B
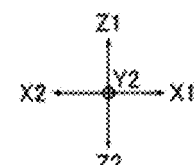

INFORMATION PROCESSING DEVICE

RELATED APPLICATIONS

The present application is National stage of application No. PCT/JP2023/004976, filed on Feb. 14, 2023, and claims priority based on Japanese Patent Application No. 2022-029297, filed Feb. 28, 2022.

TECHNICAL FIELD

The present invention relates to an information processing device such as a payment terminal device for processing data requiring security of safety.

BACKGROUND ART

Conventionally, a payment terminal device for performing cashless payment with a credit card or the like has been known (for example, see Patent Literature 1). A payment terminal device described in Patent Literature 1 includes a display (display part) on which an operation menu is displayed and a housing to which the display is attached. The display is a touch panel and is disposed outside the housing. A user of a payment terminal device described in Patent Literature 1 presses a predetermined indication on a screen of the display to perform a predetermined operation.

Further, conventionally, an information processing device such as a card reader or an electronic transaction device has been known (for example, see Patent Literature 2). The information processing device described in Patent Literature 2 includes a housing (security case) structured of a housing case and a housing cover, and a board disposed inside the housing. The board is an electronic component for processing security information (in other words, information requiring security of safety). An inside surface of the housing is formed with a printed wiring pattern for detecting an illegal disassembling act by which the housing is illegally disassembled and a breaking act of the housing. The board disposed inside the housing is covered by the printed wiring pattern from all directions.

CITATION LIST

Patent Literature

[PTL 1] Japanese Patent Laid-Open No. 2020-77082
[PTL 2] Japanese Patent Laid-Open No. 2009-93401

SUMMARY OF THE INVENTION

Problems to be Solved by the Invention

The present inventors have been developing an information processing device provided with a display such as a liquid crystal display for processing data requiring security of safety, for example, like a payment terminal device described in Patent Literature 1. In the information processing device, processing of data requiring security of safety is performed and thus, the information processing device requires a high level of safety (security). Therefore, in order to secure a high level of safety in the information processing device, the present inventors have examined a structure like the information processing device described in Patent Literature 2 that a control board for processing data requiring security of safety is accommodated in a housing and, for example, the control board is covered by a flexible printed board formed with a tamper detection pattern for detecting an illegal act of a criminal. However, an illegal act by a criminal has been skillfully performed year by year and thus, an information processing device having a higher level of safety is required in the market.

In view of the problem described above, the present invention provides an information processing device which is provided with a display such as a liquid crystal display, performs processing of data requiring security of safety, and is capable of further enhancing safety.

Means to Solve the Problems

To solve the above-mentioned problem, an embodiment of the present invention provides an information processing device including a control board, a housing in which the control board is accommodated, a display which is disposed outside the housing and is fixed to the housing, a flexible printed board which is disposed inside the housing and covers one of faces of the control board, and a detection mechanism for detecting that the display has been detached from the housing. When a side where the control board is disposed with respect to the flexible printed board is referred to as a first direction side, and an opposite side to the first direction side is referred to as a second direction side, the flexible printed board is formed in a box shape whose first direction side is opened and is disposed on the first direction side with respect to the display, the flexible printed board is formed with a tamper detection pattern for detecting at least its own disconnection, the detection mechanism includes a contact type detection switch and a rod-shaped member in a bar shape which presses the detection switch, and the rod-shaped member is pressed against the detection switch by the display which is fixed to the housing.

The information processing device in this embodiment includes, in addition to the flexible printed board which covers one of faces of the control board in an inside of the housing and is formed with the tamper detection pattern, the detection mechanism for detecting that the display disposed outside the housing has been detached from the housing. Therefore, according to this embodiment, even when a criminal is going to perform an illegal act on the control board which is accommodated in the housing by detaching the display from the housing, a predetermined abnormality processing is capable of being performed based on a detection result of the detection mechanism. Therefore, in this embodiment, safety of the information processing device can be further enhanced.

Further, in this embodiment, the detection mechanism includes the contact type detection switch and the rod-shaped member in a bar shape which presses the detection switch, and the rod-shaped member is pressed against the detection switch by the display which is fixed to the housing. In other words, in this embodiment, the display fixed to the housing presses the contact type detection switch through the rod-shaped member. Therefore, according to this embodiment, it can be surely detected by the detection mechanism that the display has been detached from the housing. Further, in this embodiment, the display presses the detection switch through the rod-shaped member and thus, even when a distance between the display and the detection switch is large, the detection switch can be pressed by using the rod-shaped member.

In this embodiment, for example, the control board is provided with a second tamper detection pattern layer formed with a second tamper detection pattern for detecting at least its own disconnection, and a data signal pattern layer formed with a data signal pattern for transmitting a signal of data requiring security of safety, a face on the second direction side of the control board is mounted with an electronic component for processing data requiring security of safety, and the second tamper detection pattern layer is disposed on the first direction side with respect to the data signal pattern layer.

In this embodiment, it is preferable that the control board is mounted with a tamper detection circuit with which the flexible printed board, the detection switch and the display are electrically connected, and the tamper detection circuit is provided with a first breakage detection circuit for detecting at least disconnection of the tamper detection pattern, a second breakage detection circuit for detecting damage of the display, and a detachment detection circuit for detecting detachment of the display from the housing. According to this structure, even when a criminal has damaged the display for performing an illegal act on the control board which is accommodated in the housing, a predetermined abnormality processing is capable of being performed based on a detection result of the second breakage detection circuit. As a result, safety of the information processing device can be further enhanced.

In this embodiment, it is preferable that the detection switch is mounted on a face on the second direction side of the control board and is covered by the flexible printed board, and the flexible printed board and the housing are formed with through holes in which the rod-shaped member is disposed on their inner peripheral sides. According to this structure, a board for mounting the detection switch is not required to provide separately. Therefore, a structure of the information processing device can be simplified.

In this embodiment, for example, the display is a liquid crystal display and is a touch panel. Further, in this embodiment, it may be structured that the information processing device includes, for example, an aerial image formation mechanism which forms an image as an aerial image by projecting an image indicated on a display surface of the display onto space, and a finger-tip detection mechanism for detecting a position of a finger-tip of a user of the information processing device in an aerial image display region which is a region where the aerial image is displayed, and the finger-tip detection mechanism is electrically connected with the control board.

Effects of the Invention

As described above, in this embodiment, in the information processing device which is provided with a display such as a liquid crystal display and performs processing of data requiring security of safety, safety of the information processing device is capable of being further enhanced.

BRIEF DESCRIPTION OF THE DRAWINGS

FIGS. 7A and 7B are enlarged cross-sectional views for explaining a structure of a detection mechanism shown in FIG. 2.

DESCRIPTION OF EMBODIMENTS

An embodiment of the present invention will be described below with reference to the accompanying drawings.

Structure of Information Processing Device

Figure 1A:
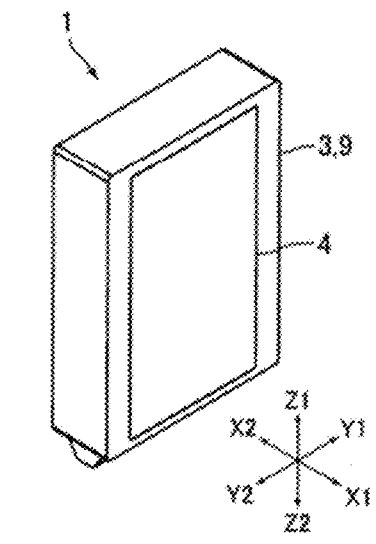
FIGS. 1A and 1B are perspective views showing an information processing device in accordance with an embodiment of the present invention.
Figure 1B:
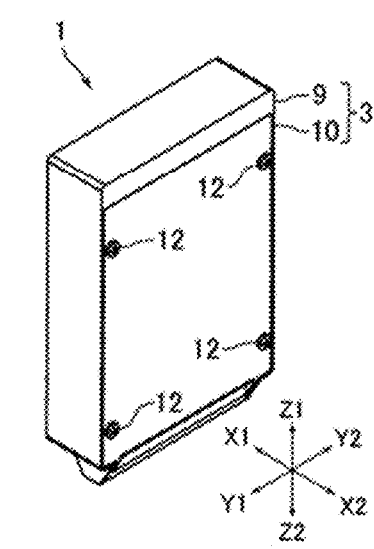
Figure 2:
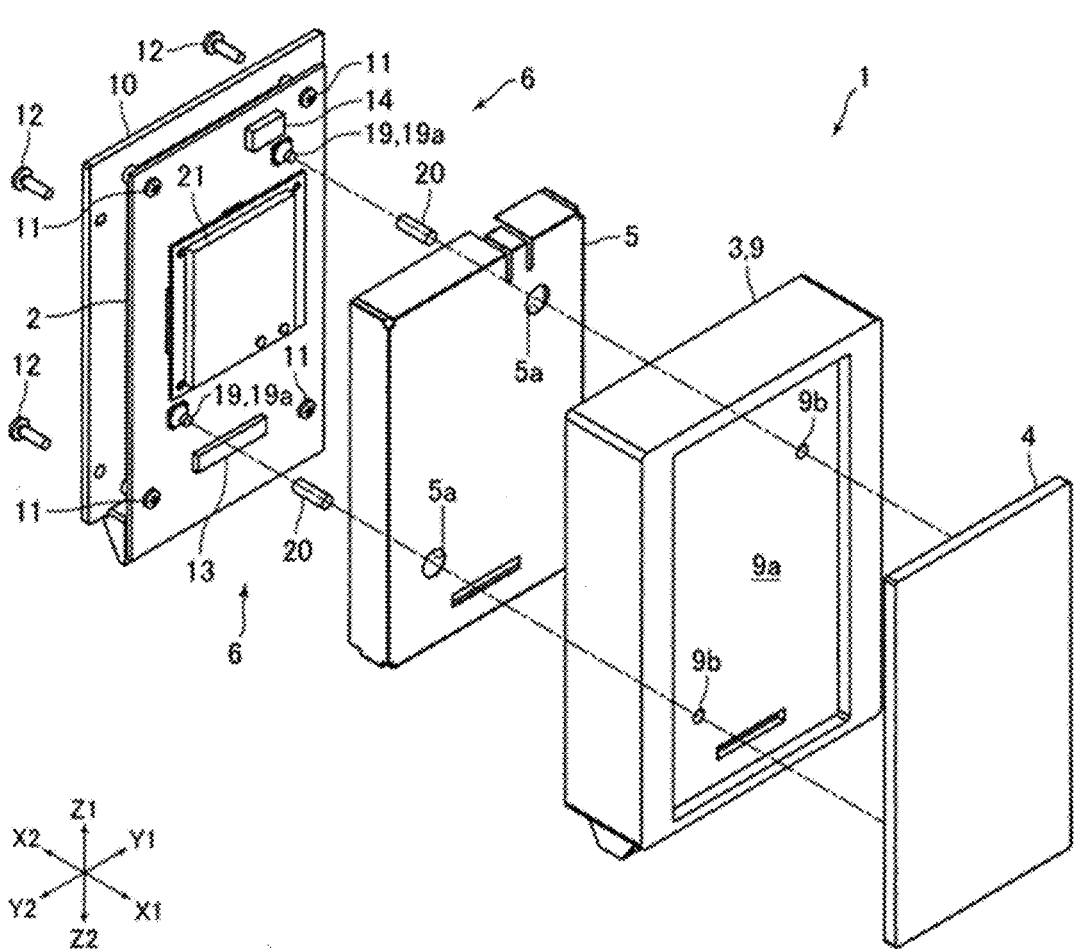
FIG. 2 is an exploded perspective view showing the information processing device in FIGS. 1A and 1B.
Figure 3:
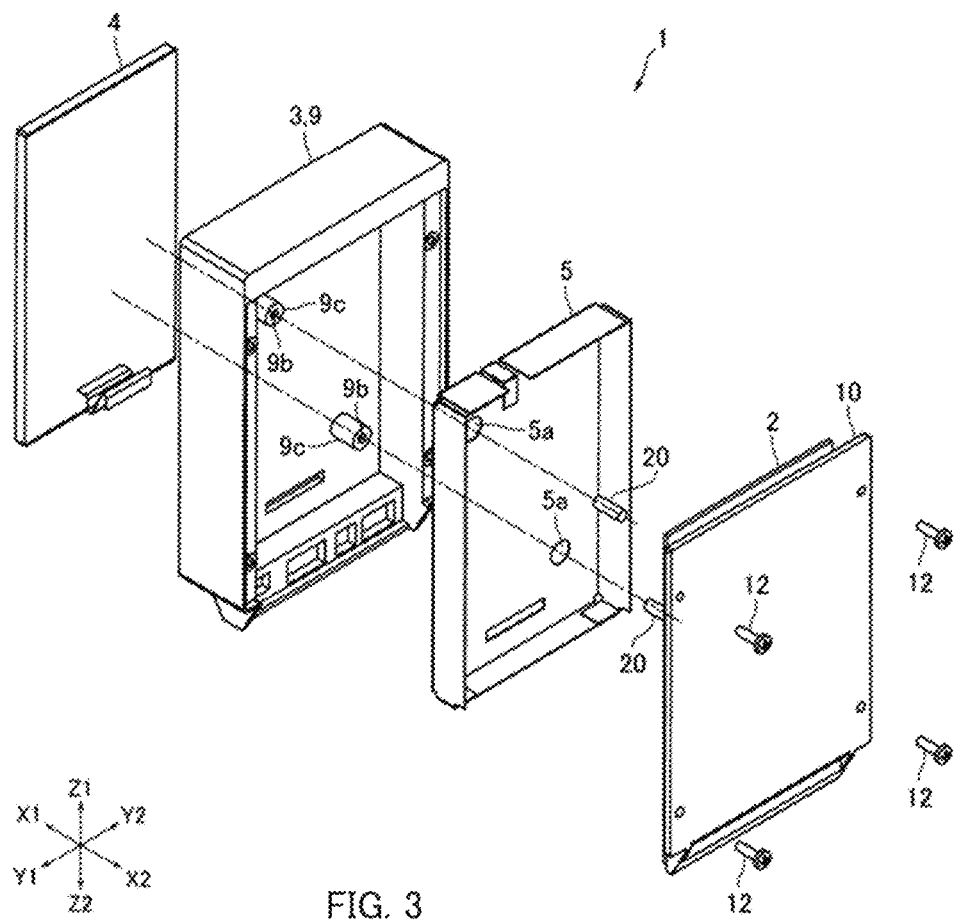
FIG. 3 is an exploded perspective view showing the information processing device in FIG. 2 which is viewed in a different direction.
Figure 4:
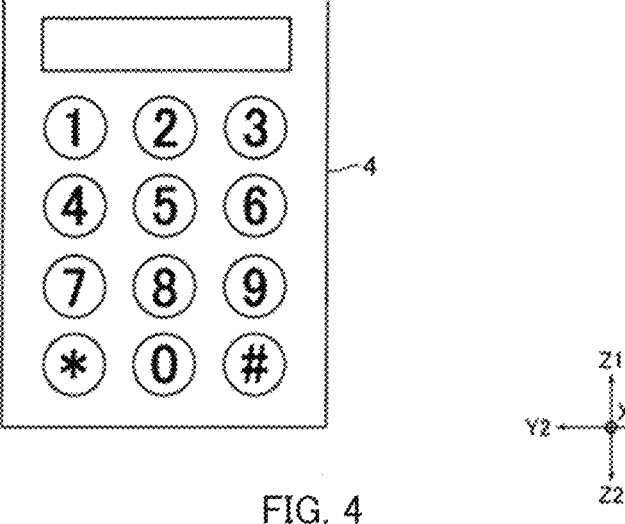
FIG. 4 is a view showing one example of an image which is displayed on a display shown in FIG. 1A.
Figures 5A, 5B:
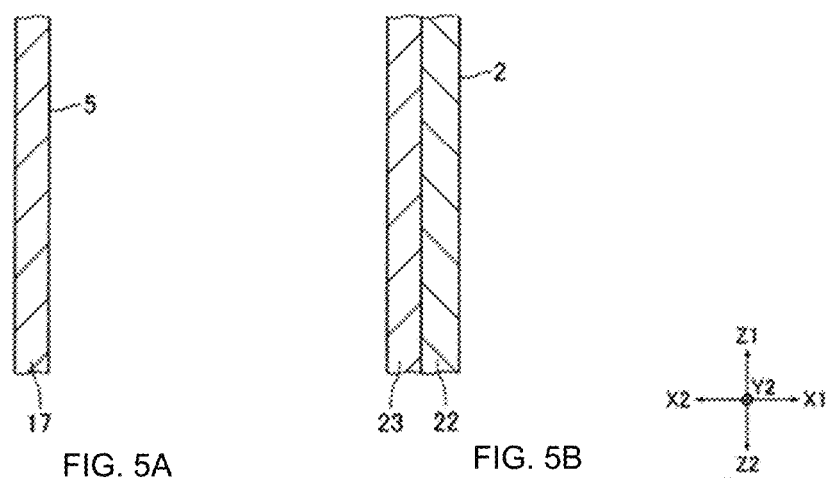
FIG. 5A is a cross-sectional view showing a part of a flexible printed board in FIG. 2.
FIG. 5B is a cross-sectional view showing a part of a control board in FIG. 2.
Figure 6:
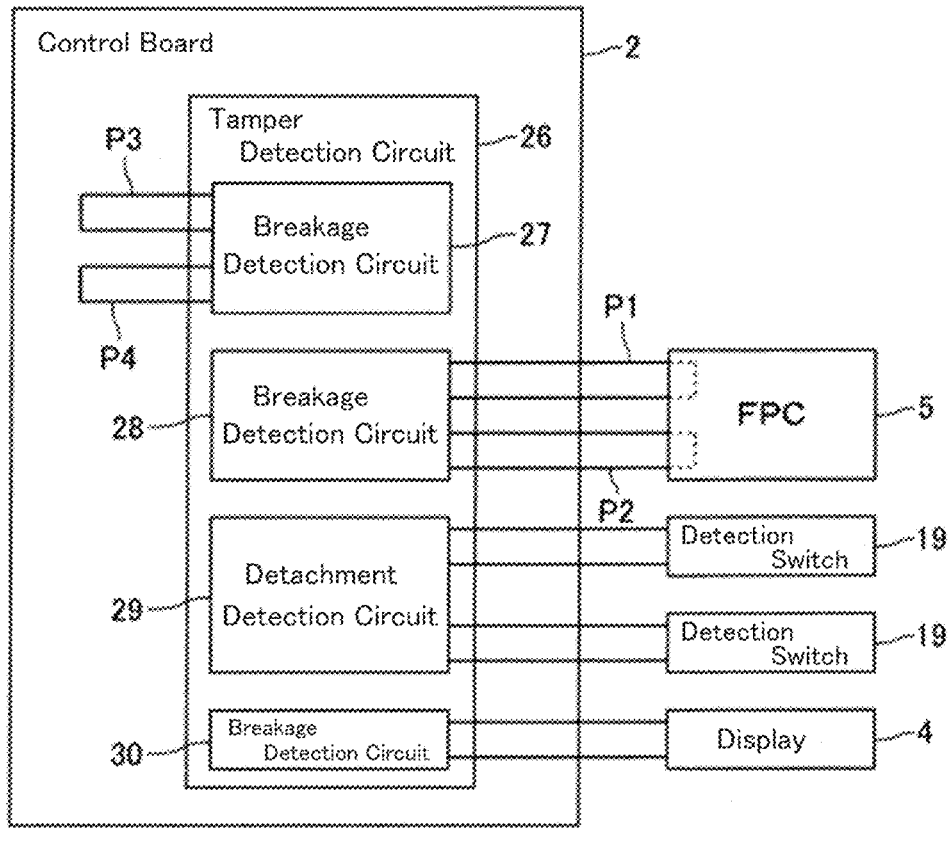
FIG. 6 is a block diagram for explaining a configuration of a control board shown in FIG. 2.

FIGS. 1A and 1B are perspective views showing an information processing device 1 in accordance with an embodiment of the present invention. FIG. 2 is an exploded perspective view showing the information processing device 1 in FIGS. 1A and 1B. FIG. 3 is an exploded perspective view showing the information processing device 1 in FIG. 2 which is viewed in a different direction. FIG. 4 is a view showing one example of an image which is displayed on a display 4 shown in FIG. 1A. FIG. 5A is a cross-sectional view showing a part of a flexible printed board 5 in FIG. 2, and FIG. 5B is a cross-sectional view showing a part of a control board 2 in FIG. 2. FIG. 6 is a block diagram for explaining a configuration of a control board 2 shown in FIG. 2. FIGS. 7A and 7B are enlarged cross-sectional views for explaining a structure of a detection mechanism 6 shown in FIG. 2.

An information processing device 1 in this embodiment is a payment terminal device for performing cashless payment and performs processing of data required to secure safety (security). The information processing device 1 is provided with an information input function for inputting information such as a personal identification number. Further, the information processing device 1 includes a control board 2 for processing data requiring security of safety, a housing 3 in which the control board 2 is accommodated, a display 4 which is disposed outside the housing 3 and is fixed to the housing 3, a flexible printed board 5 (hereinafter, referred to as an "FPC 5") which is disposed inside the housing 3 and covers one of faces of the control board 2, and a detection mechanism 6 for detecting that the display 4 has been detached from the housing 3.

The control board 2 is a rigid board such as a glass epoxy substrate. The control board 2 is formed in a flat plate shape. Specifically, the control board 2 is formed in a rectangular flat plate shape. The control board 2 is, for example, electrically connected with an antenna coil for communicating data with a card, a smartphone or the like in a non-contact manner, IC contact springs which are brought into contact with external connection terminals of IC contacts formed on a card and perform communication of data, a magnetic head for performing reading and the like of magnetic data recorded on a card, and the like.

In the following descriptions, a thickness direction of the control board 2 is defined as a front and rear direction, a direction which is perpendicular to the front and rear direction and is parallel to a long side of the control board 2 formed in a rectangular shape is defined as an upper and lower direction, and a direction perpendicular to the front and rear direction and the upper and lower direction (in other words, a direction parallel to a short side of the control board 2) is defined as a right and left direction. Further, the X1 direction side in FIG. 2 and the like which is one side in the front and rear direction is referred to as a "front" side, the X2 direction side in FIG. 2 and the like which is an opposite side to the front side is referred to as a "rear" side, the Y1 direction side in FIG. 2 and the like which is one side in the right and left direction is referred to as a "right" side, the Y2 direction side in FIG. 2 and the like which is an opposite side to the right side is referred to as a "left" side, the Z1 direction side in FIG. 2 and the like which is one side in the upper and lower direction is referred to as an "upper" side, and the Z2 direction side in FIG. 2 and the like which is an opposite side to the upper side is referred to as a "lower" side.

The housing 3 is structured of a case body 9 formed in a box shape whose rear side is opened and a cover member 10 which closes the opening of the case body 9. The case body 9 is formed in a flat rectangular parallelepiped box shape whose thickness in the front and rear direction is thin, and a rear face of the case body 9 is opened. An outside shape of the case body 9 when viewed in the front and rear direction is a rectangular shape. When viewed in the front and rear direction, a long side of the case body 9 whose outside shape is rectangular is parallel to the upper and lower direction, and a short side of the case body 9 is parallel to the right and left direction. As shown in FIG. 2, a front face of the case body 9 is formed with a recessed part 9a in a rectangular shape which is recessed toward the rear side.

A front face part of the case body 9 is formed with through holes 9b in a round hole shape which penetrate through the case body 9 in the front and rear direction. The through hole 9b is formed at two positions, i.e., at a right upper end side and a left lower end side in the front face part of the case body 9. A front end of the through hole 9b is connected with a bottom face of the recessed part 9a which is recessed toward the rear side. As shown in FIG. 3, a rear face of the front face part of the case body 9 is formed with protruded parts 9c in a cylindrical tube shape which are protruded toward the rear side. The protruded part 9c is formed in a portion where the through hole 9b is formed, and an inner peripheral side of the protruded part 9c is formed as a part of the through hole 9b.

The cover member 10 is formed in a flat plate shape. The cover member 10 is disposed so that a thickness direction of the cover member 10 and the front and rear direction are coincided with each other. A front face of the cover member 10 is formed with four protruded parts in a cylindrical tube shape which are protruded toward the front side. The control board 2 is fixed to the four protruded parts by screws 11. In other words, the control board 2 is fixed to the cover member 10. Further, the control board 2 is fixed to the cover member 10 at four positions in the vicinities of four corners of the control board 2. A rear face of the control board 2 is contacted with front faces of the protruded parts of the cover member 10. The cover member 10 is fixed to the case body 9 by screws 12. The cover member 10 is fixed to the case body 9 at four positions in the vicinities of four corners of the case body 9. A front face of the cover member 10 is contacted with a rear end face of the case body 9.

The display 4 is a liquid crystal display. Further, the display 4 is a touch panel. In other words, the display 4 is provided with an input function for inputting information in addition to a display function. The display 4 is formed in a rectangular flat plate shape. The display 4 is disposed so that a thickness direction of the display 4 and the front and rear direction are coincided with each other, and the display 4 and the control board 2 are disposed in parallel with each other. Further, the display 4 is disposed so that a direction of a long side of the display 4 is coincided with the upper and lower direction (in other words, a direction of a short side of the display 4 is coincided with the right and left direction). The display 4 is disposed inside the recessed part 9a of the case body 9. The display 4 is fixed to the case body 9 by a screw or a double-sided tape not shown.

The display 4 is electrically connected with the control board 2. A front face of the control board 2 is mounted with a connector 13 for electrically connecting the display 4 with the control board 2. The display 4 structures a most part of a front face of the information processing device 1. A front face of the display 4 is structured as a display surface which displays an image. In this embodiment, a user who stands in front of the information processing device 1 performs a predetermined operation for performing a cashless payment on a front face side of the information processing device 1. For example, as shown in FIG. 4, the display 4 indicates a keypad for inputting a personal identification number and a user inputs his/her personal identification number by utilizing a keypad indicated on the display 4. In other words, a user inputs his/her personal identification number by successively pressing predetermined keys (numeral) of the keypad indicated on the display 4 which is a touch panel.

The FPC 5 is formed in a box shape whose rear side is opened. Specifically, the FPC 5 is formed in a flat rectangular parallelepiped box shape whose thickness in the front and rear direction is thin, and a rear face side of the FPC 5 is opened. The FPC 5 is formed by bending a flat film-shaped flexible printed board having flexibility in a rectangular parallelepiped box shape and solidifying it. An outside shape of the FPC 5 when viewed in the front and rear direction is a rectangular shape. When viewed in the front and rear direction, a long side of the FPC 5 whose outside shape is a rectangular shape is parallel with the upper and lower direction, and a short side of the FPC 5 is parallel with the right and left direction.

The FPC 5 is disposed on a front side with respect to the control board 2 and covers a front face of the control board 2. A rear end of the FPC 5 is contacted with a front face of the control board 2. The FPC 5 is electrically connected with the control board 2. A front face of the control board 2 is mounted with a connector 14 for electrically connecting the FPC 5 with the control board 2. Further, the FPC 5 is accommodated in the housing 3 and is disposed on a rear side with respect to the display 4. A front face part of the FPC 5 is formed with through holes 5a in a round hole shape into which the protruded parts 9c of the case body 9 are inserted. A rear side (X2 direction side) in this embodiment is a first direction side which is a side where the control board 2 is disposed with respect to the FPC 5, and a front side (X1 direction side) is a second direction side which is an opposite side to the first direction side.

The FPC 5 is formed with tamper detection patterns P1 and P2 (see FIG. 6). In other words, the FPC 5 is provided with a tamper detection pattern layer 17 (see FIG. 5A) in which the tamper detection patterns P1 and P2 are formed. For example, the FPC 5 is formed two tamper detection patterns P1 and P2. The tamper detection patterns P1 and P2 are provided for detecting that the tamper detection patterns P1 and P2 themselves have been disconnected and that the tamper detection pattern P1 and the tamper detection pattern P2 are short-circuited.

The tamper detection pattern layer 17 is formed in the entire area of the FPC 5. A surface of the tamper detection pattern layer 17 is covered by an insulating coating not shown. In the tamper detection pattern layer 17, the tamper detection pattern P1 and the tamper detection pattern P2 are irregularly routed in a paired state. Further, the tamper detection patterns P1 and P2 are routed in the entire area of the tamper detection pattern layer 17. In other words, the tamper detection patterns P1 and P2 are routed in the entire area of the FPC 5.

The detection mechanism 6 is disposed at two positions. In other words, the information processing device 1 includes two detection mechanisms 6. The detection mechanism 6 includes a contact type detection switch 19 and a rod-shaped member (pin) 20 which is formed in a rod shape and structured to press the detection switch 19. The detection switch 19 is a push-button switch. In other words, the detection switch 19 is a push type detection switch. The detection switch 19 is mounted on a front face of the control board 2. The detection switch 19 is mounted at two positions, i.e., on a right upper end side and a left bottom end side of the front face of the control board 2. The detection switch 19 is covered by the FPC 5.

The detection switch 19 includes a column-shaped movable pin 19a which is movable in the front and rear direction. The movable pin 19a is disposed so that an axial direction of the movable pin 19a and the front and rear direction are coincided with each other. The movable pin 19a is urged toward the front side. The rod-shaped member 20 is formed in a column shape. The rod-shaped member 20 is disposed so that an axial direction of the rod-shaped member 20 and the front and rear direction are coincided with each other. The rod-shaped member 20 is disposed on a front side with respect to the movable pin 19a of the detection switch 19. A rear end face of the rod-shaped member 20 is contacted with a front end face of the movable pin 19a. A most part of the rod-shaped member 20 is disposed in an inside of the through hole 9b of the case body 9. In other words, the rod-shaped member 20 is disposed on an inner peripheral side of the through hole 9b of the case body 9 and the through hole 5a of the FPC 5. As described above, an inner peripheral side of the protruded part 9c of the case body 9 is a part of the through hole 9b, and the protruded part 9c provides a holding function for the rod-shaped member 20.

A front end face of the rod-shaped member 20 is contacted with a rear face of the display 4. In other words, the rod-shaped member 20 is sandwiched between the movable pin 19a and the display 4. The rod-shaped member 20 is pressed against the movable pin 19a by the display 4 which is fixed to the housing 3. In other words, the rod-shaped member 20 is pressed against the detection switch 19 by the display 4 which is fixed to the housing 3. In this embodiment, when the display 4 is fixed to the housing 3, as shown in FIG. 7A, the movable pin 19a is pressed to a rear side by the rod-shaped member 20 and thus, the detection switch 19 is brought into an ON-state.

On the other hand, when the display 4 is detached from the housing 3, as shown in FIG. 7B, the movable pin 19a is moved to a front side and the detection switch 19 is switched to an OFF state. Therefore, detachment of the display 4 from the housing 3 can be detected based on a detection result of the detection switch 19. In accordance with an embodiment of the present invention, it may be structured that the detection switch 19 is brought into an OFF state when the movable pin 19a is pressed toward a rear side and, when the movable pin 19a is moved to a front side, the detection switch 19 is switched to an ON state.

A front face of the control board 2 is mounted with an electronic component 21 for processing data requiring security of safety. The electronic component 21 is a CPU (Central Processing Unit) or the like. The control board 2 is a multilayer board. The control board 2 includes a data signal pattern layer 22 which is formed with a data signal pattern for transmitting a signal of data requiring security of safety (see FIG. 5B) and a tamper detection pattern layer 23 which is formed with the tamper detection patterns P3 and P4 (see FIG. 6). The data signal pattern is electrically connected with the electronic component 21. The tamper detection pattern layer 23 in this embodiment is a second tamper detection pattern layer.

The data signal pattern layer 22 and the tamper detection pattern layer 23 are overlapped with each other in a thickness direction of the control board 2 (in other words, in the front and rear direction). The tamper detection pattern layer 23 is disposed on a rear side with respect to the data signal pattern layer 22. An insulating layer not shown is formed between the data signal pattern layer 22 and the tamper detection pattern layer 23. A surface of the data signal pattern layer 22 and a surface of the tamper detection pattern layer 23 are covered by an insulating coating not shown.

The tamper detection pattern layer 23 is formed over an entire area of the control board 2. The tamper detection pattern layer 23 is, for example, formed with two tamper detection patterns P3 and P4. The tamper detection patterns P3 and P4 are provided for detecting that the tamper detection patterns P3 and P4 themselves have been disconnected and that the tamper detection pattern P3 and the tamper detection pattern P4 are short-circuited. The tamper detection pattern P3 and the tamper detection pattern P4 are irregularly routed in a paired state in the tamper detection pattern layer 23. Further, the tamper detection patterns P3 and P4 are routed over the entire area of the tamper detection pattern layer 23. In other words, the tamper detection patterns P3 and P4 are routed over the entire area of the control board 2. The tamper detection patterns P3 and P4 in this embodiment are a second tamper detection pattern.

As described above, the electronic component 21 for processing data requiring security of safety is mounted on a front face of the control board 2, and the data signal pattern layer 22 which is formed with a data signal pattern for transmitting a signal of data requiring security of safety is disposed on a front side with respect to the tamper detection pattern layer 23. Further, a rear end of the box-shaped FPC 5 whose entire area is formed with the tamper detection patterns P1 and P2 is contacted with the front face of the control board 2, and the FPC 5 covers the front face of the control board 2. In this embodiment, the entire area of the control board 2 which requires security of safety is covered by the FPC 5 and the tamper detection pattern layer 23 from both sides in the front and rear direction and is disposed in an inside of the area determined by the FPC 5 and the tamper detection pattern layer 23.

The control board 2 is mounted with the tamper detection circuit 26 with which the display 4, the FPC 5 and the detection switches 19 are electrically connected. The tamper detection circuit 26 is mounted in the control board 2 on a front side with respect to the tamper detection pattern layer 23. The tamper detection circuit 26 includes a breakage detection circuit 27 for detecting that the tamper detection patterns P3 and P4 have been disconnected and that the tamper detection pattern P3 and the tamper detection pattern P4 are short-circuited, a breakage detection circuit 28 for detecting that the tamper detection patterns P1 and P2 have been disconnected and that the tamper detection pattern P1 and the tamper detection pattern P2 are short-circuited, a detachment detection circuit 29 for detecting that the display 4 has been detached from the housing 3, and a breakage detection circuit 30 for detecting that the display 4 has been damaged.

The tamper detection patterns P3 and P4 are electrically connected with the breakage detection circuit 27. The tamper detection patterns P1 and P2 are electrically connected with the breakage detection circuit 28. The two detection switches 19 are electrically connected with the detachment detection circuit 29. The display 4 is electrically connected with the breakage detection circuit 30. The breakage detection circuit 28 in this embodiment is a first breakage detection circuit, and the breakage detection circuit 30 is a second breakage detection circuit.

In the information processing device 1, a criminal is going to perform an illegal act for illegally acquiring data from the control board 2 and, when at least one of the following situations is detected, in other words, in the tamper detection circuit 26, when the tamper detection patterns P3 and P4 have been disconnected, the tamper detection pattern P3 and the tamper detection pattern P4 have been short-circuited, the tamper detection patterns P1 and P2 have been disconnected, and the tamper detection pattern P1 and the tamper detection pattern P2 have been short-circuited, when the display 4 has been detached from the housing 3 and the display 4 has been damaged, a predetermined abnormality processing is performed, for example, data stored in the control board 2 are erased, or the control board 2 is set in an unusable state.

Principal Effects in this Embodiment

As described above, in this embodiment, the information processing device 1 includes, in addition to the FPC 5 which covers a front face of the control board 2 in an inside of the housing 3 and is formed with the tamper detection patterns P1 and P2, the detection mechanism 6 for detecting that the display disposed outside the housing 3 has been detached from the housing 3. Further, in this embodiment, the tamper detection circuit 26 which is mounted in the control board 2 is, in addition to the breakage detection circuit 28 for detecting that the tamper detection patterns P1 and P2 have been disconnected and that the tamper detection pattern P1 and the tamper detection pattern P2 are short-circuited, provided with the detachment detection circuit 29 for detecting that the display 4 has been detached from the housing 3.

In addition, in this embodiment, a criminal is going to perform an illegal act on the control board 2 which is accommodated in the housing 3 and thereby, in a case that the tamper detection patterns P1 and P2 have been disconnect, or the tamper detection pattern P1 and the tamper detection pattern P2 have been short-circuited, a predetermined abnormality processing is performed based on a detection result of the breakage detection circuit 28. Furthermore, even when a criminal has detached the display 4 from the housing 3 for performing an illegal act on the control board 2 which is accommodated in the housing 3, a predetermined abnormality processing is performed based on a detection result of the detachment detection circuit 29. Therefore, in this embodiment, safety of the information processing device 1 can be further enhanced.

Especially, in this embodiment, the tamper detection circuit 26 is provided with the breakage detection circuit 30 for detecting that the display 4 has been damaged and, even when a criminal has damaged the display 4 for performing an illegal act on the control board 2 which is accommodated in the housing 3, a predetermined abnormality processing is performed based on a detection result of the breakage detection circuit 30. Therefore, in this embodiment, safety of the information processing device 1 can be further enhanced.

In this embodiment, the detection mechanism 6 includes the contact type detection switch 19 and the rod-shaped member 20 in a bar shape for pressing the detection switch 19, and the rod-shaped member 20 is pressed against the detection switch 1 by the display 4 which is fixed to the housing 3. In other words, in this embodiment, the display 4 fixed to the housing 3 presses the contact type detection switch 19 through the rod-shaped member 20. Therefore, according to this embodiment, it can be surely detected by the detection mechanism 6 that the display 4 has been detached from the housing 3. Further, according to this embodiment, the display 4 presses the detection switch 19 through the rod-shaped member 20 and thus, even when a distance between the display 4 and the detection switch 19 is large in the front and rear direction, the detection switch 19 can be pressed by using the rod-shaped member 20.

In this embodiment, the detection switch 19 is mounted on a front face of the control board 2. Therefore, according to this embodiment, a board for mounting the detection switch 19 is not required to provide separately. Accordingly, in this embodiment, a structure of the information processing device 1 can be simplified.

Modified Embodiment of Information Processing Device

Figure 8:
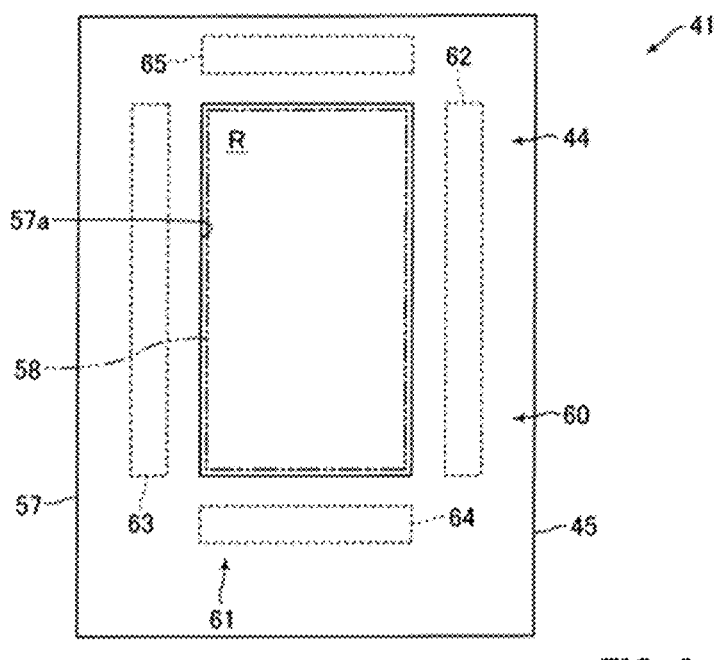
FIG. 8 is a schematic view for explaining a structure of an information processing device in accordance with another embodiment of the present invention.
Figure 9:
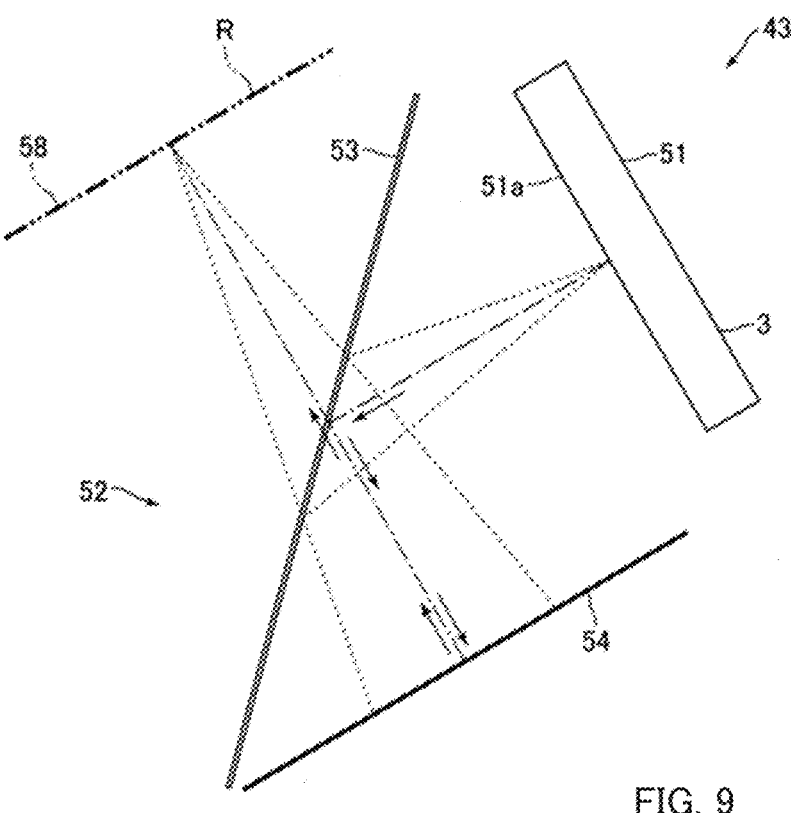
FIG. 9 is a schematic view for explaining a structure of an aerial image display mechanism which is used in the information processing device shown in FIG. 8.

FIG. 8 is a schematic view for explaining a structure of an information processing device 41 in accordance with another embodiment of the present invention. FIG. 9 is a schematic view for explaining a structure of an aerial image display mechanism 43 which is used in the information processing device 41 shown in FIG. 8.

In the embodiment described above, the display 4 is, in addition to a display function, provided with an input function for inputting information, but the display 4 may be provided with no input function. In other words, the display 4 may not be a touch panel. Next, a structure of an information processing device 41 will be described below in a case that the display 4 is not a touch panel.

An information processing device 41 is, similarly to the information processing device 1, a payment terminal device for performing a cashless payment. The information processing device 41 includes an aerial image display mechanism 43 for displaying an aerial image in three-dimensional space, a finger-tip detection mechanism 44 for detecting a position of a finger-tip of a user of the information processing device 41 in an aerial image display region "R" which is a region where an aerial image is displayed, and a housing 45 in which the aerial image display mechanism 43 and the finger-tip detection mechanism 44 are accommodated. In FIG. 8, the aerial image display mechanism 43 is not shown.

The aerial image display mechanism 43 includes a display mechanism 51 having a display surface 51a for displaying an image, and an aerial image formation mechanism 52 which forms an aerial image by projecting an image displayed on the display surface 51a to space. The display mechanism 51 is structured of the control board 2, the housing 3, the display 4, the FPC 5, the detection mechanism 6 and the like in the embodiment described above, and a display surface of the display 4 is the display surface 51a. The aerial image formation mechanism 52 is provided with a beam splitter 53 and a retroreflective material 54.

As shown in FIG. 9, the beam splitter 53 reflects a part of a light which is emitted from the display surface 51a. The light reflected by the beam splitter 53 is incident to the retroreflective material 54. The retroreflective material 54 reflects the incident light in the same direction as the incident direction toward the beam splitter 53. The light reflected by the retroreflective material 54 transmits through the beam splitter 53. An aerial image is formed in the aerial image display region "R" by the light transmitted through the beam splitter 53. As shown in FIG. 8, the housing 45 is provided with a frame body 57 which surrounds the aerial image display region "R". An inner peripheral side of the frame body 57 is formed as an opening part 57a which communicates with an inside of the housing 45. The aerial image display region "R" is formed in an inside of the opening part 57a. The aerial image display region "R" is an input part 58 to which a user inputs his/her personal identification number by using a finger-tip.

The finger-tip detection mechanism 44 is electrically connected with the control board 2. The finger-tip detection mechanism 44 detects a position of a finger-tip of a user in the aerial image display region "R" as described above. In other words, the input part 58 is included in a detection range of the finger-tip detection mechanism 44. The finger-tip detection mechanism 44 is structured of the first detection mechanism 60 and the second detection mechanism 61. The first detection mechanism 60 is a transmission type optical sensor having a light-emitting part 62 and a light-receiving part 63 which are disposed so as to interpose the aerial image display region "R". The second detection mechanism 61 is a transmission type optical sensor having a light-emitting part 64 and a light-receiving part 65 which are disposed so as to interpose the aerial image display region "R" in a direction perpendicular to the direction in which the light-emitting part 62 and the light-receiving part 63 face each other.

The first detection mechanism 60 and the second detection mechanism 61 are, for example, infrared sensors. Further, the first detection mechanism 60 and the second detection mechanism 61 are line sensors. The light-emitting parts 62 and 64 and the light-receiving parts 63 and 65 are disposed in side parts with respect to the opening part 57a. When a finger-tip of a user is disposed in the predetermined region including the aerial image display region "R" (in other words, a predetermined region including the input part 58), infrared lights do not enter specific light receiving elements among a plurality of light receiving elements provided in the light-receiving parts 63 and 65. Therefore, a position of a finger-tip of a user is detected in a predetermined region including the aerial image display region "R" by the finger-tip detection mechanism 44.

In the information processing device 41, the display mechanism 51 displays a keypad for inputting a personal identification number on the display surface 51a. In other words, the display 4 displays a keypad as shown in FIG. 4. The aerial image formation mechanism 52 displays the keypad indicated on the display surface 51a in the aerial image display region "R" as an aerial image. A user inputs his/her personal identification number by utilizing the keypad indicated on the aerial image display region "R". Specifically, a user successively moves his/her finger-tip to positions of predetermined keys (numeral) of the keypad displayed on the aerial image display region "R" and thereby, his/her personal identification number is inputted. In other words, a user successively moves his/her finger-tip in the input part 58 to input his/her personal identification number.

A position of a finger-tip of a user in the input part 58 is detected by the finger-tip detection mechanism 44. Position data of a finger-tip detected by the finger-tip detection mechanism 44 are transmitted to the control board 2. In the control board 2, the personal identification number inputted in the input part 58 is recognized based on a detection result of the finger-tip detection mechanism 44. Also in this modified embodiment, similar effects to the embodiment described above can be obtained. In accordance with an embodiment of the present invention, it may be structured that the first detection mechanism 60 and the second detection mechanism 61 are a reflection type optical sensor provided with a light-emitting part which emits infrared light and a light-receiving part to which the infrared light emitted from the light-emitting part and reflected by a finger-tip of a user is incident.

Other Embodiments

Although the present invention has been shown and described with reference to a specific embodiment, various changes and modifications will be apparent to those skilled in the art from the teachings herein.

In the embodiment described above, the number of the tamper detection patterns formed in the FPC 5 may be one or three or more. In a case that the number of the tamper detection pattern formed in the FPC 5 is one, the tamper detection pattern is provided only for detecting its own disconnection. Similarly, in the embodiment described above, the number of the tamper detection patterns formed in the tamper detection pattern layer 23 of the control board 2 may be one or three or more. In a case that the number of the tamper detection pattern formed in the tamper detection pattern layer 23 is one, the tamper detection pattern is provided only for detecting its own disconnection.

In the embodiment described above, the control board 2 may be formed with no tamper detection pattern layer 23. In this case, for example, a flexible printed board in which a tamper detection pattern is formed is disposed between a rear face of the control board 2 and a front face of the cover member 10, and the flexible printed board covers the rear face of the control board 2. Further, in the embodiment described above, information inputted in the display 4 which is a touch panel may be information other than a personal identification number. For example, a signature of a user may be inputted in the display 4. In this case, an image corresponding to inputted information is indicated on the display 4.

In the embodiment described above, the display 4 may be a display other than a liquid crystal display. For example, the display 4 may be an organic electro-luminescence display (organic EL display). Further, in the embodiment described above, the detection switch 19 is provided with the movable pin 19a. However, the detection switch 19 may be a membrane switch (sheet switch) which is provided with no movable pin 19a. Further, the detection switch 19 may be a lever-shaped detection switch. In addition, in the embodiment described above, the rod-shaped member 20 may be formed in a shape other than a columnar shape. For example, the rod-shaped member 20 may be formed in a rectangular or square pillar shape. Further, in the embodiment described above, the number of the detection mechanisms 6 included in the information processing device 1 may be one or three or more.

In the embodiment described above, it may be structured that the detection switch 19 is not mounted on the control board 2. In this case, a board on which the detection switch 19 is mounted is provided separately. Further, in the embodiment described above, the tamper detection circuit 26 may be provided with no breakage detection circuit 30. In this case, even when the display 4 is damaged, the control board 2 does not recognize the damage of the display 4. In addition, in the embodiment described above, the control board 2 may be formed in a square flat plate shape, or may be formed in a flat plate shape other than a rectangle and a square. Further, in the embodiment described above, the control board 2 may be a flexible printed board. Further, the information processing device 1 to which the present invention is applied may be a device other than a payment terminal device.

What is claimed is:

1. An information processing device comprising:
a control board;
a housing in which the control board is accommodated;
a display which is disposed outside the housing and is fixed to the housing;
a flexible printed board which is disposed inside the housing and covers one of faces of the control board; and
a detection mechanism which detects that the display has been detached from the housing;
wherein in a case that a side where the control board is disposed with respect to the flexible printed board is referred to as a first direction side, and an opposite side to the first direction side is referred to as a second direction side,
the flexible printed board is formed in a box shape whose first direction side is opened and is disposed on the first direction side with respect to the display;
the flexible printed board is formed with a tamper detection pattern which detects at least its own disconnection;
the detection mechanism comprises a contact type detection switch and a rod-shaped member in a bar shape which presses the detection switch; and
the rod-shaped member is pressed against the contact type detection switch by the display which is fixed to the housing.

2. The information processing device according to claim 1, wherein
the control board comprises:
a second tamper detection pattern layer formed with a second tamper detection pattern which detects at least its own disconnection; and
a data signal pattern layer formed with a data signal pattern which transmits a signal of data requiring security of safety,
a face on the second direction side of the control board is mounted with an electronic component which processes data requiring security of safety, and
the second tamper detection pattern layer is disposed on the first direction side with respect to the data signal pattern layer.

3. The information processing device according to claim 2, wherein
the control board is mounted with a tamper detection circuit with which the flexible printed board, the contact type detection switch and the display are electrically connected, and
the tamper detection circuit comprises:
a first breakage detection circuit which detects at least disconnection of the tamper detection pattern;
a second breakage detection circuit which detects damage of the display; and a detachment detection circuit which detects detachment of the display from the housing.

4. The information processing device according to claim 3, wherein
the contact type detection switch is mounted on a face on the second direction side of the control board and is covered by the flexible printed board, and
the flexible printed board and the housing are formed with through holes in which the rod-shaped member is disposed on their inner peripheral sides.

5. The information processing device according to claim 4, wherein the display is a liquid crystal display and is a touch panel.

6. The information processing device according to claim 4, further comprising:
an aerial image formation mechanism which forms an image as an aerial image by projecting an image indicated on a display surface of the display onto space; and
a finger-tip detection mechanism which detects a position of a finger-tip of a user of the information processing device in an aerial image display region which is a region where the aerial image is displayed,
wherein the finger-tip detection mechanism is electrically connected with the control board.

7. The information processing device according to claim 2, wherein
the contact type detection switch is mounted on a face on the second direction side of the control board and is covered by the flexible printed board, and
the flexible printed board and the housing are formed with through holes in which the rod-shaped member is disposed on their inner peripheral sides.

8. The information processing device according to claim 2, wherein the display is a liquid crystal display and is a touch panel.

9. The information processing device according to claim 2, further comprising:
an aerial image formation mechanism which forms an image as an aerial image by projecting an image indicated on a display surface of the display onto space; and
a finger-tip detection mechanism which detects a position of a finger-tip of a user of the information processing device in an aerial image display region which is a region where the aerial image is displayed,
wherein the finger-tip detection mechanism is electrically connected with the control board.

10. The information processing device according to claim 1, wherein
the control board is mounted with a tamper detection circuit with which the flexible printed board, the contact type detection switch and the display are electrically connected, and
the tamper detection circuit comprises:
a first breakage detection circuit which detects at least disconnection of the tamper detection pattern;
a second breakage detection circuit which detects damage of the display; and
a detachment detection circuit which detects detachment of the display from the housing.

11. The information processing device according to claim 10, wherein
the contact type detection switch is mounted on a face on the second direction side of the control board and is covered by the flexible printed board, and

US 12,596,851 B2

15 the flexible printed board and the housing are formed with through holes in which the rod-shaped member is disposed on their inner peripheral sides.

12. The information processing device according to claim 10, wherein the display is a liquid crystal display and is a touch panel.

13. The information processing device according to claim 10, further comprising:

an aerial image formation mechanism which forms an image as an aerial image by projecting an image indicated on a display surface of the display onto space; and a finger-tip detection mechanism which detects a position of a finger-tip of a user of the information processing device in an aerial image display region which is a region where the aerial image is displayed, wherein the finger-tip detection mechanism is electrically connected with the control board.

14. The information processing device according to claim 1, wherein the contact type detection switch is mounted on a face on the second direction side of the control board and is covered by the flexible printed board, and the flexible printed board and the housing are formed with through holes in which the rod-shaped member is disposed on their inner peripheral sides.

15. The information processing device according to claim 14, wherein the display is a liquid crystal display and is a touch panel.

16

16. The information processing device according to claim 14, further comprising:

an aerial image formation mechanism which forms an image as an aerial image by projecting an image indicated on a display surface of the display onto space; and a finger-tip detection mechanism which detects a position of a finger-tip of a user of the information processing device in an aerial image display region which is a region where the aerial image is displayed, wherein the finger-tip detection mechanism is electrically connected with the control board.

17. The information processing device according to claim 1, wherein the display is a liquid crystal display and is a touch panel.

18. The information processing device according to claim 1, further comprising:

an aerial image formation mechanism which forms an image as an aerial image by projecting an image indicated on a display surface of the display onto space; and a finger-tip detection mechanism which detects a position of a finger-tip of a user of the information processing device in an aerial image display region which is a region where the aerial image is displayed, wherein the finger-tip detection mechanism is electrically connected with the control board.

* * * * *